United States Patent
Bhandarkar et al.

(10) Patent No.: US 10,491,106 B2
(45) Date of Patent: Nov. 26, 2019

(54) DIGITAL CONTROL OF SWITCHED BOUNDARY MODE INTERLEAVED POWER CONVERTER

(71) Applicant: Microchip Technology Incorporated, Chandler, AZ (US)

(72) Inventors: Santosh Manjunath Bhandarkar, Chandler, AZ (US); Alex Dumais, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/052,026

(22) Filed: Aug. 1, 2018

(65) Prior Publication Data

US 2019/0052169 A1 Feb. 14, 2019

Related U.S. Application Data

(60) Provisional application No. 62/543,235, filed on Aug. 9, 2017.

(51) Int. Cl.
*H02M 1/42* (2007.01)
*H02M 3/158* (2006.01)

(52) U.S. Cl.
CPC ....... *H02M 1/4225* (2013.01); *H02M 3/1584* (2013.01); *H02M 2003/1586* (2013.01)

(58) Field of Classification Search
CPC ............. H02M 1/4225; H02M 3/1584; H02M 2003/1586
See application file for complete search history.

(56) References Cited

U.S. PATENT DOCUMENTS

| 6,448,745 B1 | 9/2002 | Killat | ............................ 323/222 |
| 8,098,505 B1 * | 1/2012 | Choi | .................... H02M 1/4225 323/272 |

(Continued)

FOREIGN PATENT DOCUMENTS

WO 2006/029323 A2 3/2006 ............... H02H 3/20

OTHER PUBLICATIONS

International Search Report and Written Opinion, Application No. PCT/US2018/045479, 12 pages, dated Oct. 19, 2018.

(Continued)

*Primary Examiner* — Jeffrey A Gblende
*Assistant Examiner* — Sisay G Tiku
(74) *Attorney, Agent, or Firm* — Slayden Grubert Beard PLLC

(57) ABSTRACT

A circuit arrangement, a signal processor, and a method of interleaved switched boundary mode power conversion are disclosed. The circuit arrangement comprises at least an input for receiving an input voltage from a power supply; an output to provide an output voltage to a load; a first interleaved circuit comprising a first energy storage device and a first controllable switching device; one or more secondary interleaved circuits, each comprising a secondary energy storage device, and a secondary controllable switching device; and a signal processor, connected to the controllable switching devices. The signal processor comprises a first switching cycle controller, configured for cycled zero-current switching operation of the first controllable switching device; and one or more secondary switching cycle controllers, configured for cycled zero-current switching operation of the secondary controllable switching devices. The signal processor is configured to control, in a given switching cycle, an on-time period of each of the secondary controllable switching devices to correspond to (Continued)

an on-time period of the first controllable switching device. The signal processor is further configured to control phases between the on-time periods of the first and the one or more secondary switching controllers, so that the on-time periods are distributed over the given switching cycle to reduce an overall current ripple at the input.

19 Claims, 11 Drawing Sheets

(56) References Cited

U.S. PATENT DOCUMENTS

| | | | | |
|---|---|---|---|---|
| 8,406,021 | B2* | 3/2013 | Green | H02M 1/4208 363/89 |
| 8,901,901 | B2* | 12/2014 | Ziegler | H02M 3/1584 323/271 |
| 9,240,712 | B2* | 1/2016 | Chandrasekaran | H02M 1/4225 |
| 9,973,089 | B1* | 5/2018 | Terasawa | H02M 3/158 |
| 10,164,521 | B2* | 12/2018 | Castelli | H02M 1/42 |
| 2005/0018458 | A1 | 1/2005 | Shimada et al. | 363/125 |
| 2006/0077604 | A1* | 4/2006 | Jansen | H02J 1/102 361/90 |
| 2008/0205103 | A1 | 8/2008 | Sutardja et al. | 363/84 |
| 2008/0246444 | A1 | 10/2008 | Shao et al. | 323/207 |
| 2009/0206805 | A1 | 8/2009 | Choi et al. | 323/271 |
| 2009/0257257 | A1* | 10/2009 | Adragna | H02M 3/1584 363/65 |
| 2009/0267658 | A1* | 10/2009 | Bridge | H02M 3/1584 327/141 |
| 2010/0097828 | A1 | 4/2010 | Chen | 363/72 |
| 2010/0165683 | A1 | 7/2010 | Sugawara | 363/126 |
| 2010/0244789 | A1* | 9/2010 | Osaka | H02M 3/1584 323/271 |
| 2011/0110134 | A1 | 5/2011 | Gaboury et al. | 363/126 |
| 2011/0149622 | A1* | 6/2011 | Lin | H02M 1/4208 363/124 |
| 2012/0092905 | A1 | 4/2012 | Srighakollapu et al. | 363/37 |
| 2012/0224401 | A1 | 9/2012 | Phadke | 363/84 |
| 2012/0244789 | A1 | 9/2012 | Sheu | 451/388 |
| 2012/0262958 | A1* | 10/2012 | Feldtkeller | H02M 1/4225 363/44 |
| 2014/0103861 | A1 | 4/2014 | Carletti et al. | 320/107 |
| 2014/0176089 | A1 | 6/2014 | Yang et al. | 323/207 |
| 2014/0334196 | A1 | 11/2014 | Chen et al. | 363/21.04 |
| 2014/0362614 | A1 | 12/2014 | Koga | 363/21.17 |
| 2015/0146458 | A1 | 5/2015 | Lim | 363/44 |
| 2016/0105096 | A1 | 4/2016 | Chen et al. | 323/210 |
| 2016/0276924 | A1 | 9/2016 | Castelli et al. | 363/21.13 |
| 2018/0020515 | A1 | 1/2018 | Rutgers | |
| 2018/0109191 | A1 | 4/2018 | Chan et al. | |
| 2019/0052179 | A1* | 2/2019 | Bhandarkar | H02M 3/158 |

OTHER PUBLICATIONS

International Search Report and Written Opinion, Application No. PCT/US2018/045492, 10 pages, dated Nov. 7, 2018.

Morroni, Jeffrey et al., "Design and Implementation of an Adaptive Tuning System Based on Desired Phase Margin for Digitally Controlled DC-DC Converters," IEEE Transactions on Power Electronics, vol. 24, No. 2, pp. 559-564, Feb. 1, 2009.

Juang, Kai-Cheung et al., "A Grid-Tied Flyback-Based PV Inverter with BCM Variable Frequency Voltage Mode Control," IEEE International Symposium on Intelligent Signal Processing and Communication Systems, pp. 598-603, Nov. 4, 2012.

Ryan, Robert T. et al., "Digital Control of an Interleaved BCM Boost PFC Converter with Fast Transient Response at Low Input Voltage," IEEE Energy Conversion Congress and Exposition, pp. 257-264, Oct. 1, 2017.

U.S. Non-Final Office Action, U.S. Appl. No. 16/052,208, 13 pages, dated Dec. 13, 2018.

U.S. Non-Final Office Action, U.S. Appl. No. 16/051,872, 14 pages, dated Dec. 28, 2018.

International Search Report and Written Opinion, Application No. PCT/US2018/056989, 17 pages, dated Jan. 31, 2019.

International Search Report and Written Opinion, Application No. PCT/US2018/045485, 10 pages, dated Nov. 27, 2018.

U.S. Non-Final Office Action, U.S. Appl. No. 16/165,384, 19 pages, dated Apr. 8, 2019.

U.S. Final Office Action, U.S. Appl. No. 16/052,208, 19 pages, dated Jun. 5, 2019.

U.S. Final Office Action, U.S. Appl. No. 16/051,872, 23 pages, dated Jun. 26, 2019.

* cited by examiner

DIGITAL CONTROL OF SWITCHED BOUNDARY MODE INTERLEAVED POWER CONVERTER

RELATED PATENT APPLICATION

This application claims priority to U.S. Provisional Patent Application No. 62/543,235 filed Aug. 9, 2017, the entire contents of which are hereby incorporated by reference for all purposes.

TECHNICAL FIELD

The present disclosure relates to power converters and, more particularly, to control of an interleaved boundary mode power converter.

BACKGROUND

Power converters and in particular switched-mode power converters are used in a variety of applications to provide AC/DC and DC/DC conversion. For example, switched-mode power converters, also referred to as switched-mode power supplies (SMPS), are widely used in computer and mobile phone power supply units to provide the necessary operating voltages from typical 120V/240V AC mains lines.

Typical items of concern when designing power converters relate to conversion efficiency and cost. It should be readily apparent that power losses should be minimized to increase the overall efficiency of the converter and also to reduce the generation of heat, which may be difficult to dissipate depending on the design and the respective application.

It is known to operate switched-mode power converters in boundary conduction mode or short "boundary mode" (BCM). Unlike a continuous operation in CCM (continuous conduction mode), in boundary conduction mode it is aimed to operate the switch of the power converter when no or no substantial current flows through the switch. This operational mode reduces switching losses and also allows to use less expensive components, for example less expensive boost diodes in a boost switched-mode power converter setup due to no reverse-recovery losses. In addition, BCM also allows for power factor correction (PFC), in view that the input current follows the input voltage waveform.

A by-product of BCM is that the converter inherently uses a variable switching frequency. The frequency depends primarily on the selected output voltage, the instantaneous value of the input voltage, the parameters of the energy storage used, e.g., inductance or capacitance, and the output power delivered to the load. The lowest frequency occurs at the peak of sinusoidal line voltage.

Interleaved power converters are used when higher currents are to be converted. These types of power converters comprise multiple stages/circuits, typically arranged in parallel to each other. The term "interleaved" in the present context means that multiple circuits are operated out of phase. For example, in an interleaved power converter having two stages, the stages typically operate at 180 degrees out of phase, i.e., half the switching cycle out of phase. Interleaved power converters bear the advantage of causing less input current variation/ripple and thus cause less electromagnetic interference issues.

A problem when operating an interleaved power converter in boundary conduction mode resides in the fact that the switching frequency is high and variable, with a frequency change in every cycle. Even two adjacent switching cycles do not have the same cycle period T since the input voltage is changing. It is thus complicated to maintain the above-mentioned phase shift between the multiple stages.

SUMMARY

An object thus exists to provide an efficient circuit arrangement and method for interleaved switched-mode power conversion that allows to operate in boundary conduction mode.

The object is solved by a circuit arrangement, a signal processor, and a method for interleaved switched boundary mode power conversion. The dependent claims as well as the following description contain various embodiments of the invention.

In one aspect, a circuit arrangement for interleaved switched boundary mode power conversion is provided that comprises at least an input for receiving an input voltage from a power supply, an output to provide an output voltage to a load, a first interleaved circuit, one or more secondary interleaved circuits, and a signal processor. According to this aspect, the first interleaved circuit comprises at least a first energy storage device and a first controllable switching device. The one or more secondary interleaved circuits each comprise at least a secondary energy storage device and a secondary controllable switching device. The signal processor is connected to the controllable switching devices and comprises at least a first switching cycle controller, configured for cycled/recurrent zero-current switching operation of the first controllable switching device; and one or more secondary switching cycle controllers, configured for cycled/recurrent zero-current switching operation of the secondary controllable switching devices.

The signal processor is configured to control, in a given switching cycle, an on-time period of each of the secondary controllable switching devices to correspond to an on-time period of the first controllable switching device, and to control phases between the on-time periods of the first and the one or more secondary switching controllers, so that the on-time periods are distributed over the given switching cycle to reduce an overall current ripple at the input.

A basic idea of the invention is to allow operating an interleaved switched-mode power converter in boundary conduction mode. As the inventors of the instant invention have ascertained, in this specific type of power converter, in addition to maintaining a phase requirement for interleaved operation, it is necessary to provide for zero-current switching to allow for boundary conduction mode operation. To meet these requirements with an efficient circuit setup, the invention proposes to control the switching devices to operate with corresponding or "matching" on-time periods in a given switching cycle.

BRIEF DESCRIPTION OF THE DRAWINGS

The above and other objects, features, and advantages of the current invention will become apparent from the following discussion of various embodiments. In the FIGS.

DETAILED DESCRIPTION

Figure 1:
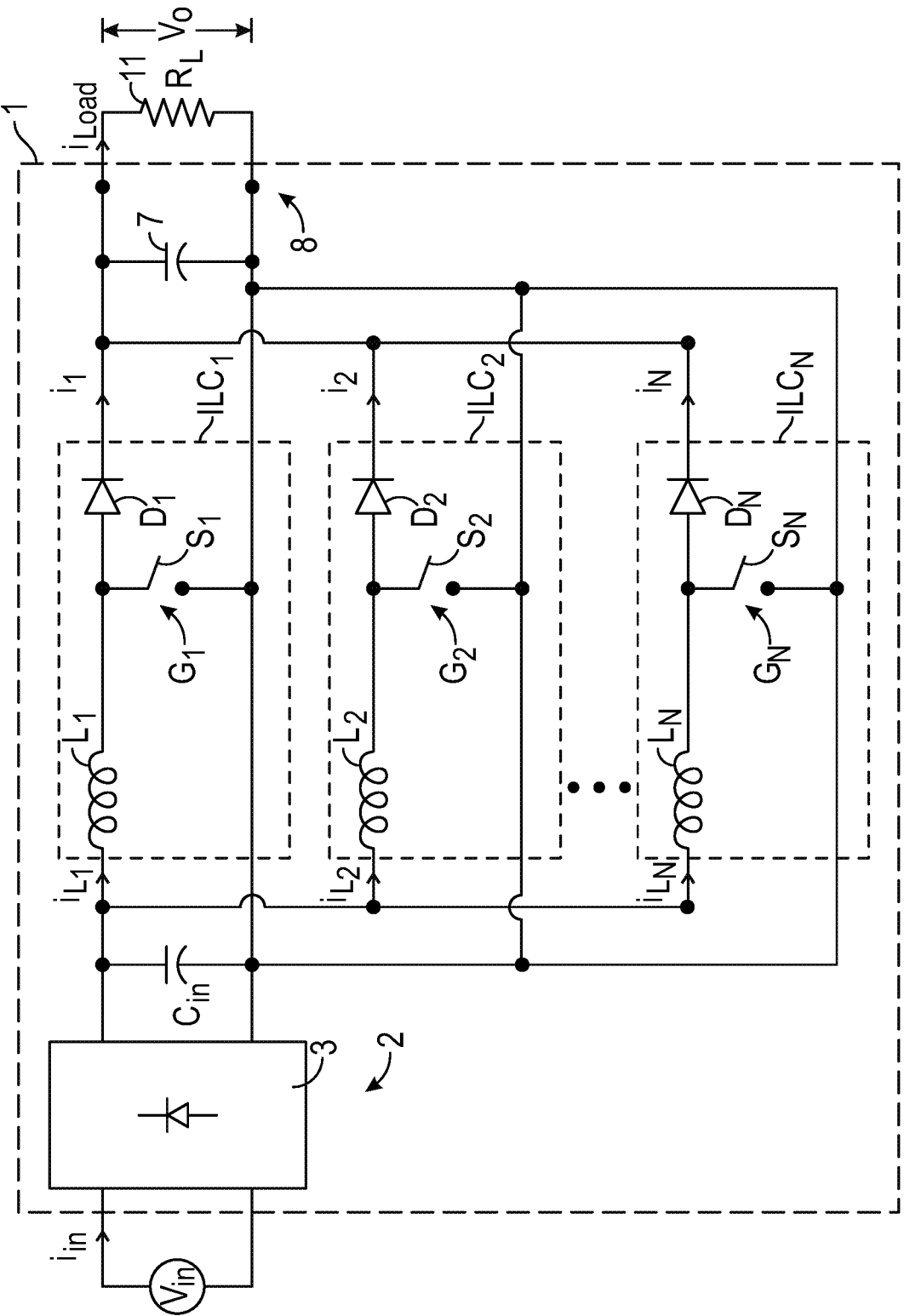
FIG. 1 shows a schematic block diagram of an embodiment of a circuit arrangement for switched boundary conduction mode (BCM) power conversion.

Technical features described in this application can be used to construct various embodiments of circuit arrangements and integrated circuit devices. Some embodiments of the invention are discussed so as to enable one skilled in the art to make and use the invention.

As discussed in the preceding, and in one aspect, a circuit arrangement for interleaved switched boundary mode power conversion is provided that comprises at least an input for receiving an input voltage from a power supply, an output to provide an output voltage to a load, a first interleaved circuit, one or more secondary interleaved circuits, and a signal processor.

According to this aspect, the first interleaved circuit comprises at least a first energy storage device and a first controllable switching device. The one or more secondary interleaved circuits each comprise at least a secondary energy storage device and a secondary controllable switching device. The signal processor is connected to the controllable switching devices and comprises at least a first switching cycle controller, configured for cycled/recurrent zero-current switching operation of the first controllable switching device; and one or more secondary switching cycle controllers, configured for cycled/recurrent zero-current switching operation of the secondary controllable switching devices.

The signal processor is configured to control, in a given switching cycle, an on-time period of each of the secondary controllable switching devices to correspond to an on-time period of the first controllable switching device, and to control phases between the on-time periods of the first and the one or more secondary switching controllers, so that the on-time periods are distributed over the given switching cycle to reduce an overall current ripple at the input.

In the context of the present discussion, the term "switched boundary mode power conversion" is understood as switched-mode electric power conversion in boundary conduction mode (BCM). A corresponding converter circuit comprises at least an energy storage device and a switching device for storing input energy temporarily and then releasing that energy to the output at a different voltage.

In some embodiments, the value of the energy storage device such as an inductor may be selected to be large in comparison to the total resistance in the circuit. The resistance (R) could be present in the form of inductor resistance, switching device resistance, filter resistance, board trace resistance etc. The inductor current in some embodiments follows a path based on the final value of current during ON time as $If*e^{(-t/\zeta)}$ where $If=Vin/R$, $\zeta=L/R$. The inductor current appears as a straight line if $\zeta$ is large. One way to increase the value of $\zeta$ is to reduce the resistance (R) value by using efficient switches and inductors. During the OFF time, the load resistance contributes to R in addition to other resistances. The value of L may be set in some embodiments by the input voltage, load range, and switching frequency limits.

In BCM, a new switching period is initiated when the current through the energy storage device returns to zero, which is at the boundary of continuous conduction (CCM) and discontinuous conduction mode (DCM).

Interleaved power conversion and a corresponding interleaved power converter is understood as using multiple stages, also referred to as "interleaved circuits" in the following, which are operated out of phase. For example, in an interleaved power converter having two interleaved circuits, the circuits typically operate at 180 degrees out of phase. In the present context, an "interleaved circuit" comprises at least an energy storage device and a controllable switching device. Typically, the interleaved circuits are connected in parallel with each other.

An "energy storage device" in the present context is understood as a device for storing electrical energy at least temporarily. For example, an energy storage device may comprise one or more inductors/inductances and/or one or more capacitors/capacitances.

A "controllable switching device" in the present context may be of any suitable type to control an electrical current. The switching device may comprise for example one or more semiconductor switches, such as bipolar transistors, field-effect transistors, MOSFETs, IGBTs, SiCs, GANs, etc.

According to the present aspect, the circuit arrangement comprises the signal processor. In this context, a signal processor is understood as a device that allows for cycled controlling of the switching device, for example according to a pulse-width-modulation (PWM), with a frequency in the kHz range. In some examples, the signal processor is configured to control the switch in PWM with a frequency of approximately 500 kHz. In some embodiments, the signal processor is a digital signal processor (DSP), e.g., a DSP with PWM units, ADCs, etc. A DSP architecture facilitates faster execution of instructions for the zero-current point detection.

The signal processor according to the present aspect comprises at least a first switching cycle controller and one or more secondary switching cycle controllers, which switching cycle controllers are configured for zero-current switching. In this context, "zero-current switching" is understood as controlling the switching device when no or just a minor current of, e.g., less than 100 μA, is flowing. As will be apparent in view that the circuit arrangement is configured for boundary conduction mode operation, zero-current switching in particular relates to the control from an off-state, i.e., non-conductive state of the switching device, to an on-state, i.e., a conductive state of the switching device when no or just a minor current is flowing.

A "zero-current point" of the energy storage device in the context of the present explanation is understood as the point in time when the energy storage device is completely discharged after a charge/discharge cycle, also referred to as "switching cycle" herein.

A "mid-cycle" time corresponds to half the switching cycle period and is thus a point in time in each switching cycle that is equally spaced between two subsequent zero-current points of the energy storage device.

According to the present aspect, the signal processor is configured to control, in a given switching cycle, an on-time period of each of the secondary controllable switching devices to correspond to an on-time period of the first controllable switching device. Accordingly, the time period in the switching cycle, in which each of the switching devices are controlled conductive, at least substantially matches, i.e., is substantially the same. In this context, the term "substantially" is understood to comprise slight deviations in the on-time periods of some nanoseconds. A deviation in the switching time period of the multiple interleaved circuits may be in the range of some 100 nanoseconds.

A "switching cycle" in this context is understood as the combined time of the respective controllable switching device being set conductive, i.e., in the on-state, and the controllable switching device subsequently being set nonconductive, i.e., in the off-state. In case of a PWM control, the switching cycle corresponds to the PWM cycle time T.

According to the present aspect, the signal processor is further configured to control phases between the on-time periods of the first and the one or more secondary switching controllers, so that the on-time periods are distributed over the given switching cycle.

As will be apparent, this will "equalize" the current input and thus reduce an overall current ripple at the input and consequently reduce electromagnetic interference effects.

In some embodiments, the on-time periods are distributed evenly over the given switching cycle, which provides a particularly beneficial reduction of overall current ripple. However, it is noted that any distribution of the on-time periods, i.e., avoidance of having the on-time periods of all controllable switching devices simultaneously, will reduce the overall current ripple.

In some embodiments, the phases between the on-time periods is set to correspond to ((n−1)/N*360, where N is the total number of interleaved circuits and n is an index number of the respective secondary interleaved circuit. Accordingly, for a given secondary interleaved circuit n, the respective phase can be determined as $$\frac{(n-1)}{N} * 360.$$

For example, given a total of N=3 interleaved circuits, the phase of a first secondary interleaved circuit, i.e., circuit n=2, is 120 degrees, while the phase of a second secondary interleaved circuit, i.e., circuit n=3, is 240 degrees. It is noted, that the term "phase" herein relates to the delay, the controllable switching device of the respective secondary interleaved circuit is set to an on-state, compared with the time, the controllable switching device of the first interleaved circuit is set to an on-state. The angular phase is defined over the switching cycle, e.g., in a PWM, the PWM cycle with time T.

Reference will now be made to the drawings in which the various elements of embodiments will be given numerical designations and in which further embodiments will be discussed.

Specific references to components, modules, units, devices, sections, parts, process steps, and other elements are not intended to be limiting. Further, it is understood that like parts bear the same or similar reference numerals, when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows a schematic block diagram of an embodiment of a circuit arrangement for switched boundary conduction mode (BCM) power conversion, namely in the instant embodiment, a switched-mode boost converter circuit 1.

The boost converter circuit 1 comprises an input or input stage 2, configured for connection to a typical mains connection, e.g., at 110V, 60 Hz or 240V, 50 Hz. A bridge rectifier 3 is provided at the input 2 to obtain positive half-waves. The boost converter circuit 1 further comprises a first interleaved circuit $ILC_1$ and multiple secondary interleaved circuits $ILC_2, \ldots,$ to $ILC_N$, connected with each other in parallel and each comprising an energy storage device in the form of an inductor $L_N$, MOSFET switching device $S_N$, and flyback diode $D_N$, where the index N refers to the respective interleaved circuit $ILC_1, ILC_2, \ldots,$ to $ILC_N$. As will be apparent from FIG. 1, the boost converter circuit 1 may comprise any number of interleaved circuits ILC greater than one, depending on the respective application and in particular, on the overall current that is to be delivered to load 11. Boost converter circuit 1 further comprises output capacitor 7, output 8, and a digital signal processor (DSP; not shown in FIG. 1) for operating the gates $G_1, G_2, \ldots, G_N$ of MOSFET switching devices $S_1, S_2, \ldots, S_N$ as explained in the following.

The general operation of circuit 1 corresponds to that of a typical boost converter. For reasons of clarity, the functionality of one interleaved circuit ILC will be discussed first, followed by a discussion of interleaved operation.

Inductor $L_N$ of circuit $ILC_N$ is charged when the respective MOSFET $S_N$ is in the on state. Once inductor $L_N$ is charged, MOSFET $S_N$ is switched to the off state, so that the only remaining current path is through the flyback diode $D_N$ and load 11, the latter of which is shown in FIG. 1 as a resistance. The voltage increases in view of the increased current from both, the inductance 4 and the input 2. The energy stored in the inductor $L_N$ during the on state is discharged into the load resistance 11 through diode $D_N$, when the MOSFET $S_N$ is in the off state.

Figure 2:
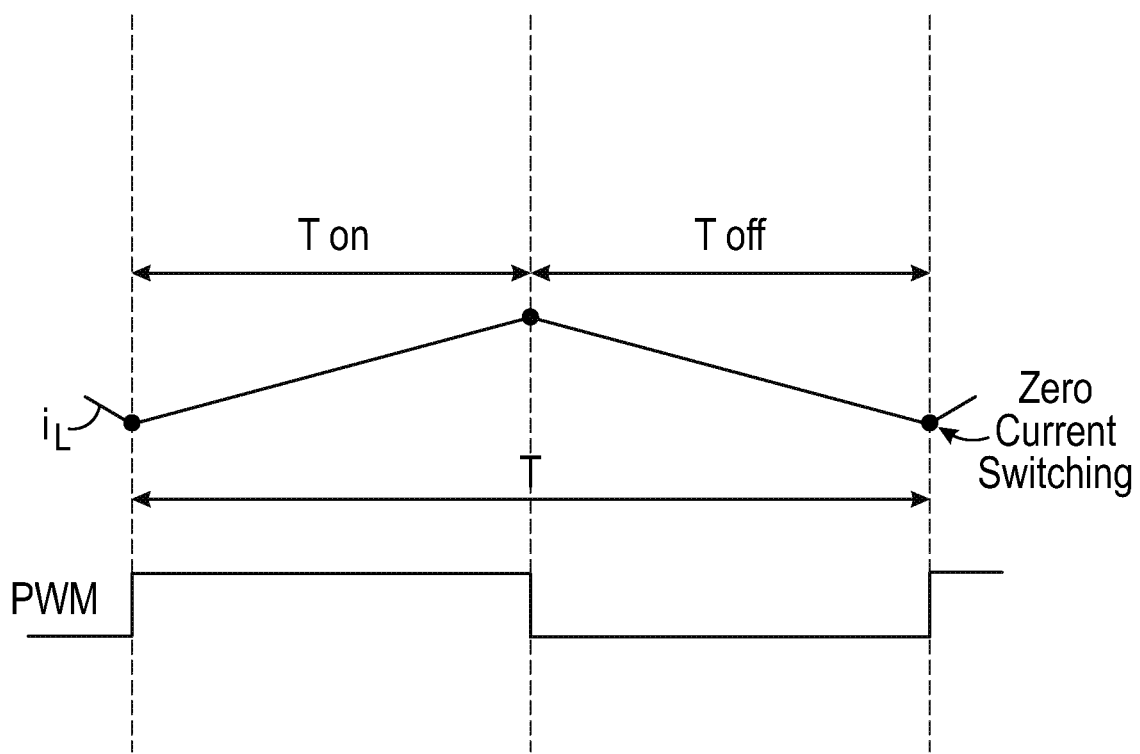
FIG. 2 shows a diagram of the inductor current $I_L$ in an exemplary schematic PWM switching cycle.

In typical BCM operation, a new switching period of the PWM is initiated when the current through the inductor 4, $i_{LN}$, returns to zero. FIG. 2 shows a diagram of the inductor current $i_L$ in an exemplary schematic PWM switching cycle. The rising current slope typically may correspond to $V_{IN}/L$ and the falling current slope may typically correspond to $$\frac{(V_{IN} - V_{OUT})}{L}.$$

As can be seen from the bottom part of FIG. 2, a PWM control signal is applied to MOSFET $S_N$. When the PWM signal is high, MOSFET $S_N$ is conductive and the current $I_{LN}$ in the inductor $L_N$ increases. This time period is described herein as $T_{ON}$ time. Once the desired charge of inductor $L_N$ is reached, the PWM signal is controlled to low and MOSFET 5 is set non-conductive. The current $I_{LN}$ gradually decreases until the inductor $L_N$ is fully discharged. This time period is described herein as $T_{OFF}$ time. Both, $T_{ON}$ and $T_{OFF}$ are a switching cycle T, i.e., in this embodiment, a PWM/switching cycle T.

When the inductor $L_N$ is fully discharged, i.e., at a "zero-current point" in time in the PWM cycle, the next PWM cycle begins. The PWM signal correspondingly is controlled high and MOSFET $S_N$ is switched conductive.

As discussed in the preceding, BCM avoids switching losses in view that the MOSFET $S_N$ is controlled from an off-state to an on-state when no substantial current flows, which is referred to herein as "zero-current switching".

Figure 3:
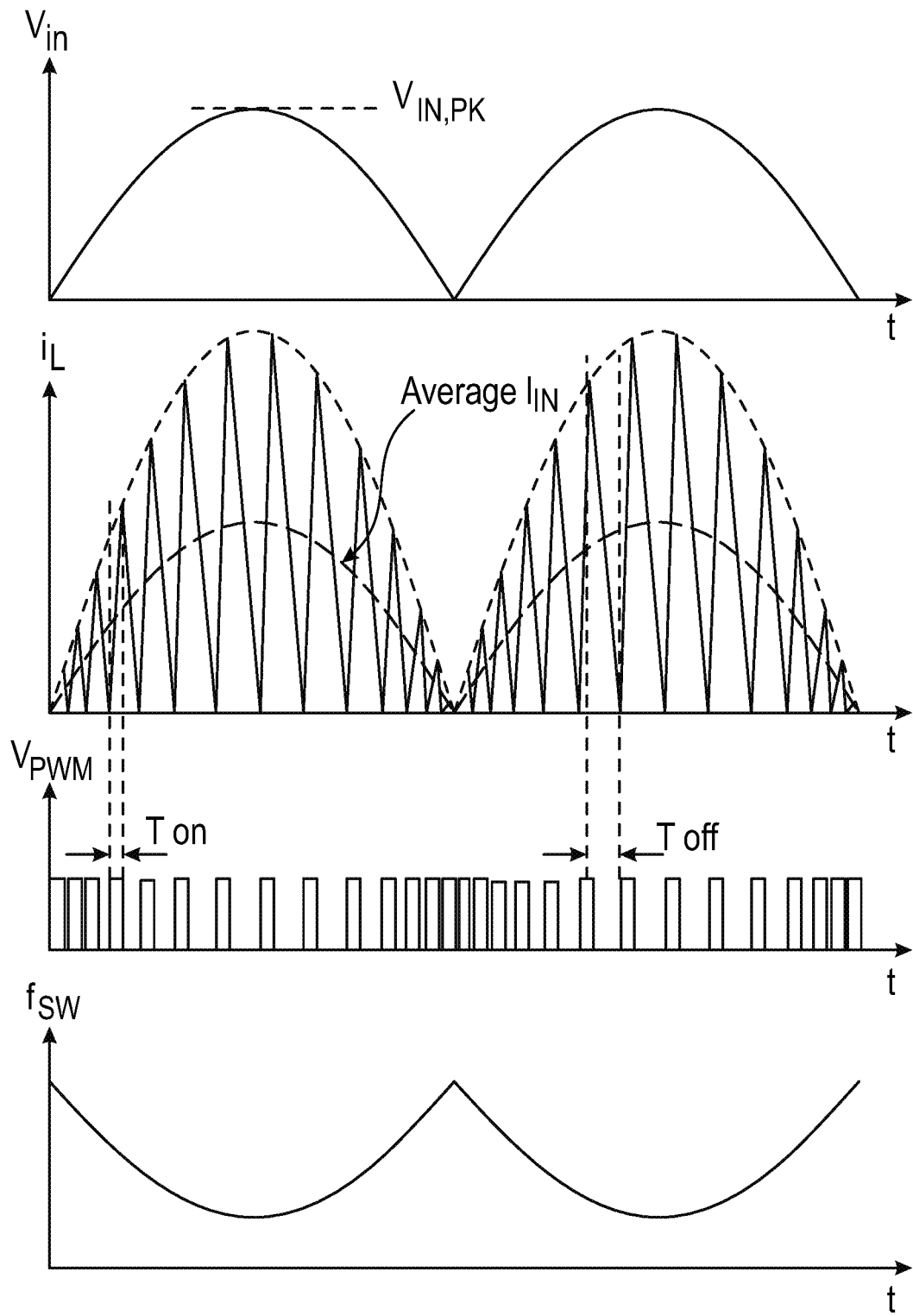
FIG. 3 shows diagrams of the operation of an interleaved circuit $ILC_N$ during a full cycle of an AC input voltage $V_{IN}$.

FIG. 3 shows diagrams of the operation of an interleaved circuit $ILC_N$ during a full cycle of AC input voltage $V_{IN}$. As will be apparent from the FIG., the inductor $L_N$ is charged and discharged multiple times in each half-cycle of the input voltage in accordance with the PWM signal, shown in FIG. 3 as $V_{PWM}$. The converter circuit 1 and more precisely, each interleaved circuit $ILC_N$ operates with a variable switching frequency, which depends primarily on the desired output reference voltage $V_{O,ref}$, the instantaneous value of the input voltage $V_{IN}$, the inductor value of inductor 4, and the output power delivered to the load $R_L$ 11.

The operating frequency changes as the input current follows the sinusoidal input voltage waveform, as shown in FIG. 3. The lowest frequency occurs at the peak of sinusoidal input, i.e., line voltage. As will be apparent from FIG. 3, and since the current waveform of $I_L$ is roughly triangular, the average value in each PWM period is proportional to the input voltage $V_{IN}$. Thus, provided a sinusoidal $V_{IN}$, the input current $I_{IN}$ of the circuit 1 follows the waveform of $V_{IN}$ with high accuracy and draws a sinusoidal input current from the mains. Accordingly, operating the converter 1 in BCM is ideal for power factor correction (PFC).

Figure 4:
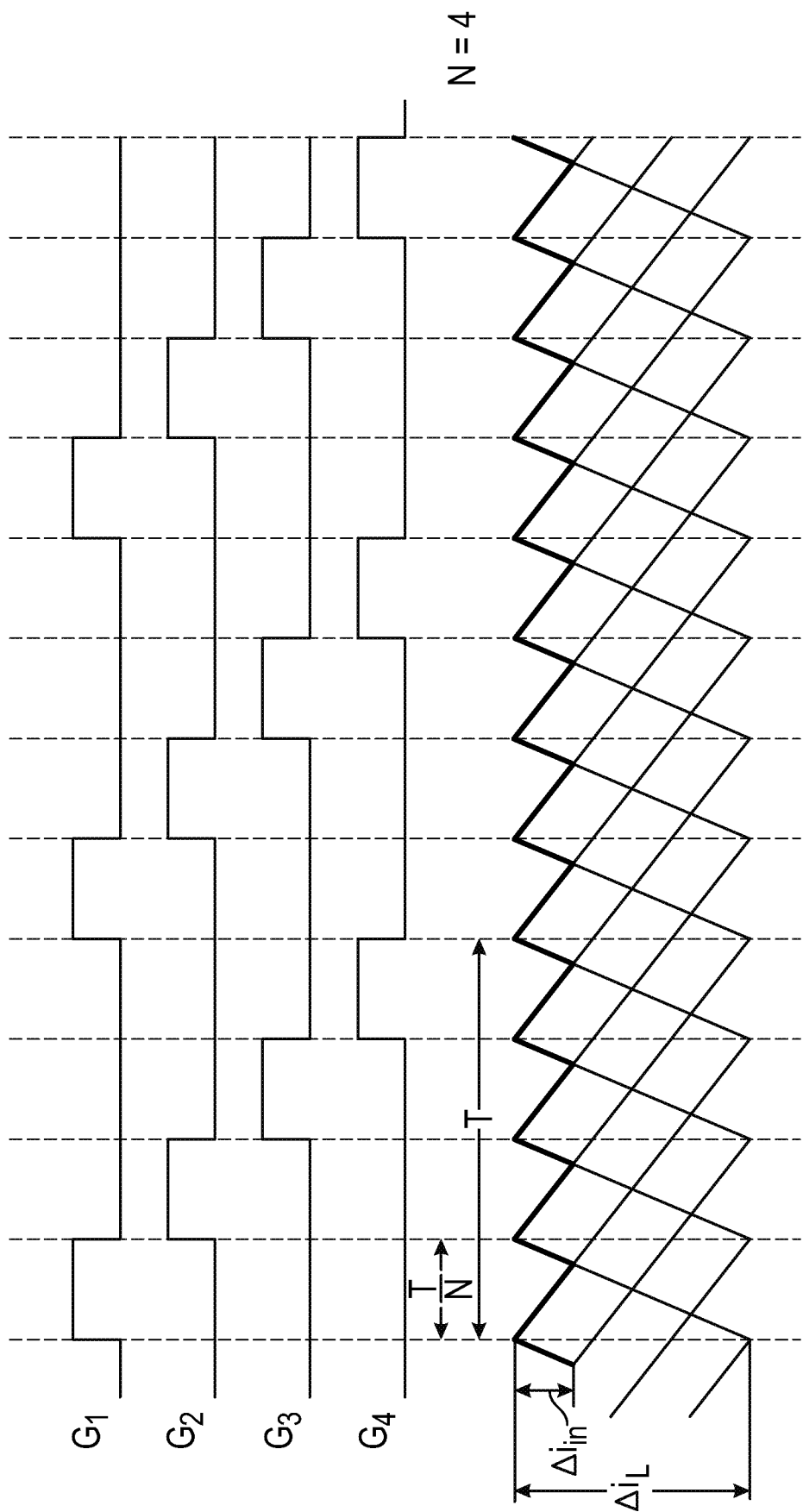
FIG. 4 shows a timing diagram of the interleaved operation of the circuit arrangement of FIG. 1.

While FIGS. 2 and 3 show the operation of each of the interleaved circuit $ILC_N$, FIG. 4 shows a timing diagram of the interleaved operation of a circuit arrangement 1 with an exemplary total number of N=4 interleaved circuits. As will be apparent from FIG. 4, interleaved circuits $ILC_N$, i.e., the gates $G_N$ of corresponding MOSFETS $S_N$ of circuits $ILC_N$ are operated out of phase to reduce a current ripple $\Delta i_{IN}$ at the input 2, which is significantly smaller than $\Delta i_L$, i.e., the maximum difference/span of current $i_L$ of one of the interleaved circuits $ILC_N$.

In the present embodiments, the operation of each secondary interleaved circuit $ILC_N$ is shifted versus the first interleaved circuit $ILC_1$ by $$\frac{(n-1)}{N} * 360,$$

where N is the total number of interleaved circuits and n is an index number of the respective secondary interleaved circuit. It follows that in the example of FIG. 4, $ILC_2$ shows a phase shift of 90°, $ILC_3$ shows a phase shift of 180°, and $ILC_4$ shows a phase shift of 270° to "equalize" or distribute the current draw from input 2 evenly over a given switching cycle T, reducing electromagnetic interference (EMI) effects and thus allows for smaller and more cost-efficient EMI filters.

Figure 5:
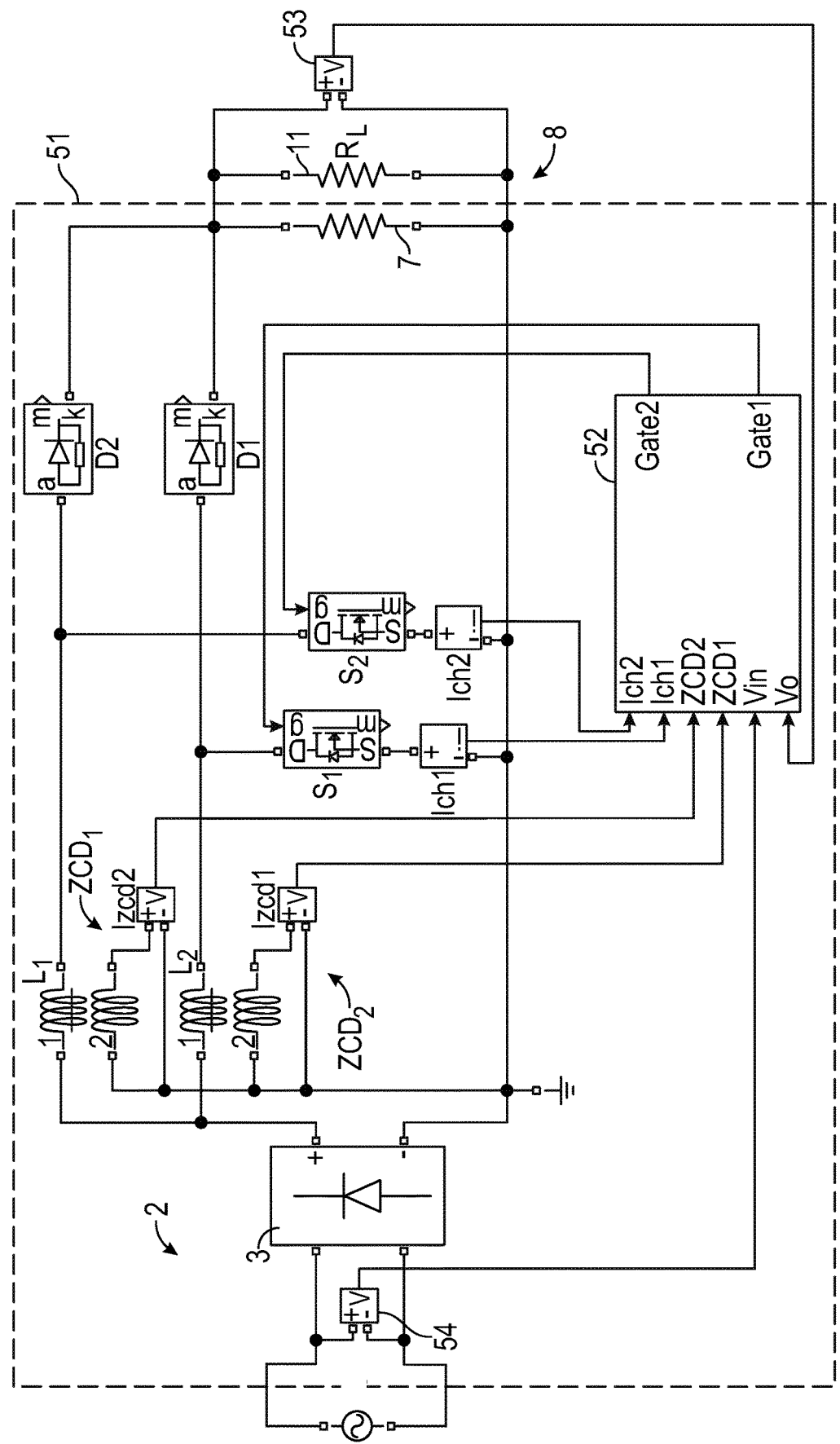
FIG. 5 shows a further embodiment of a circuit arrangement for interleaved switched boundary mode power conversion.

FIG. 5 shows a further embodiment of a circuit arrangement 51 for interleaved switched boundary mode power conversion. The circuit arrangement 51 corresponds to the circuit arrangement 1 with the following exceptions. First, circuit arrangement 51 only comprises a first interleaved circuit $ILC_1$ and a second interleaved circuit $ILC_2$, i.e., a two-stage setup. It is noted that FIG. 5 only shows two stages for clarity. Certainly, more than two-stages are possible in corresponding alternative embodiments.

Each interleaved circuit, in addition to inductor $L_N$, MOSFET switching device $S_N$, and flyback diode $D_N$, comprises a current sensor $ZCD_N$, comprising a secondary inductor, inductively coupled to the respective inductor $L_N$, as well as an associated comparator $IZCD_N$. Current sensors $ZCD_N$ are connected to digital signal processor 52 to allow zero-current switching operation. Two further comparators $I_{CH1}$ and $I_{CH2}$ are provided to determine the current through the respective MOSFET $S_1$ and $S_2$. Further comparators 53 and 54 are arranged to determine the input voltage $V_{IN}$ and $V_{OUT}$, respectively. DSP 52 in the present embodiment is of dsPIC33EP series type, available from Microchip Technology Inc., Chandler, Ariz., USA.

Digital signal processor 52 may be operated in different operating modes. In the following, an exemplary "phase update mode" is discussed with reference to the timing diagram of FIG. 6.

In this embodiment, digital signal processor 52 determines the parameters for PWM operation of the two MOSFETs $S_1$ and $S_2$. DSP 52 correspondingly comprises at least two internal PWM drive modules, configured in current reset mode.

In particular, current sensors $ZCD_N$ provide the instant time in each PWM cycle, where the current through the respective inductor $L_N$ reaches zero, which is used as a current reset trigger and thus to restart a new PWM cycle in current reset mode operation.

The desired on-time of the two MOSFETs $S_1$ and $S_2$ is determined from the current voltage $V_{OUT}$ at output 8 and comparator 53 and a reference voltage $V_{O,REF}$ that is predefined in internal memory of the DSP 52 by the manufacturer or the user of DSP 52. $V_{O,REF}$ corresponds to the desired voltage at output 8, applied to load 11. It is noted that the on-time of MOSFET $S_1$ is set to correspond to the on-time of MOSFET $S_2$ in every PWM cycle.

In addition to the above, the total PWM cycle time T is determined from the preceding PWM cycle. While doing so provides a one-cycle delay in the cycle time T, the resulting error is comparably small, even considering the changing frequency of the switching operation, as discussed in the preceding with reference to FIG. 3. To determine the PWM cycle time T, the DSP 52 is programmed to determine the elapsed time between the latest two rising edges of the PWM signal, that is provided to MOSFET $S_1$, i.e., the PWM signal, applied to the first interleaved circuit. Alternatively, the PWM cycle may be sampled using an "input capture" pin of the DSP 52, should the latter be present with the respective type of DSP 52 used.

Figure 6:
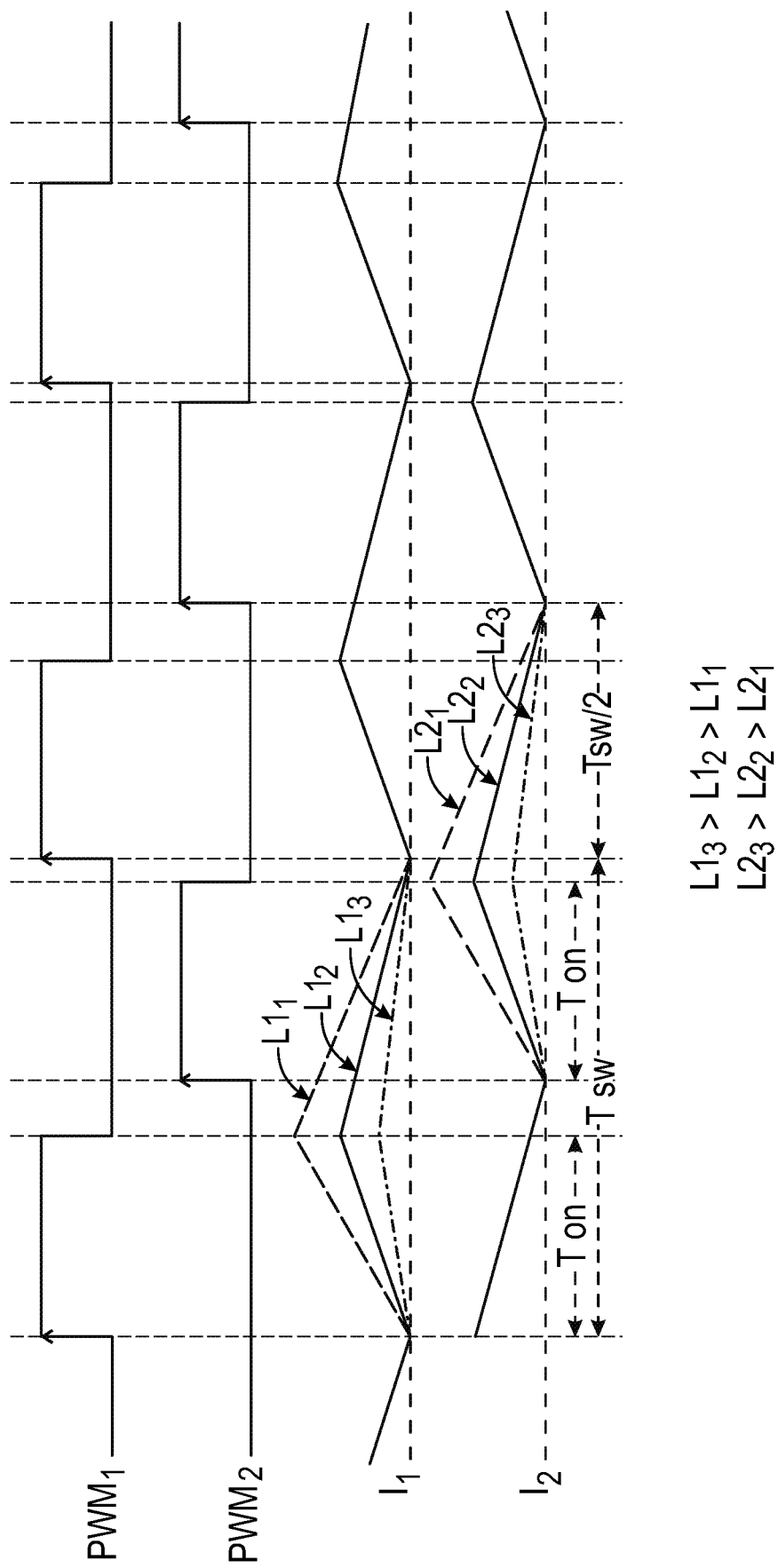
FIG. 6 shows a timing diagram of the operation of a digital signal processor in phase update mode.

With reference to the timing diagram of FIG. 6 and as shown, both interleaved circuits and more precisely MOSFETs $S_1$ and $S_2$ are operated with PWM signals. In FIG. 6, "PWM1" refers to the PWM signal, applied to MOSFET $S_1$ and "PWM2" refers to the PWM signal, applied to MOSFET $S_2$. $I_1$ and $I_2$ refer to the currents through inductors $L_1$ and $L_2$, respectively.

Both MOSFETs are driven with the same-on time in each PWM switching cycle, which allows zero-current switching and thus operation in BCM mode. PWM2 is phase shifted compared to PWM1 by half a PWM cycle, i.e., T/2, for a fully interleaved operation. The phase of PWM2 is set at the start of each switching cycle of PWM1. An alignment/update of the zero-current instant and the cycle time T is conducted at the end of each cycle, if there is any difference in the instant of the zero-current instant and phase, which can occur during short transient conditions.

FIG. 6 shows the resulting currents $I_1$ and $I_2$ for multiple inductances. As the current inventors have determined, differing inductances between the different interleaved circuits only has a negligible effect on the timing, so that slight variations in the inductances have only little effect on the timing when operating as discussed herein. It is noted however, that the power shared by the current in a given stage is inversely proportional to the value of the stage inductance, so that in some embodiments, identical inductances are used in all interleaved circuits.

As discussed in the preceding with reference to timing chart FIG. 6, the discussed interleaved BCM operation requires setting the phase of the secondary interleaved circuit in every PWM cycle, in particular in view of the changing switching frequency in boundary conduction mode. In view that some commercially available digital signal processors do not allow a phase update when operating in current reset mode, a corresponding further embodiment for the operation of the digital signal processor 52 of FIG. 5 is discussed in the following with reference to the block diagram of FIG. 7 and the timing diagram of FIG. 8, also referred to as "PWM synchronization mode". Both operating modes of digital signal processor 52, i.e., the operation discussed in the preceding with reference to FIG. 6 and the operation discussed in the following with reference to FIGS. 7 and 8 may be realized in software and/or hardware, wherein the software may be comprised in an internal memory (not shown) of digital signal processor 52. While the DSP 52 may comprise software for both operating modes, so that the desired mode can be set during operation, it is certainly sufficient, when one operating mode is provided, depending on the capabilities of the type of DSP used.

Figure 7:
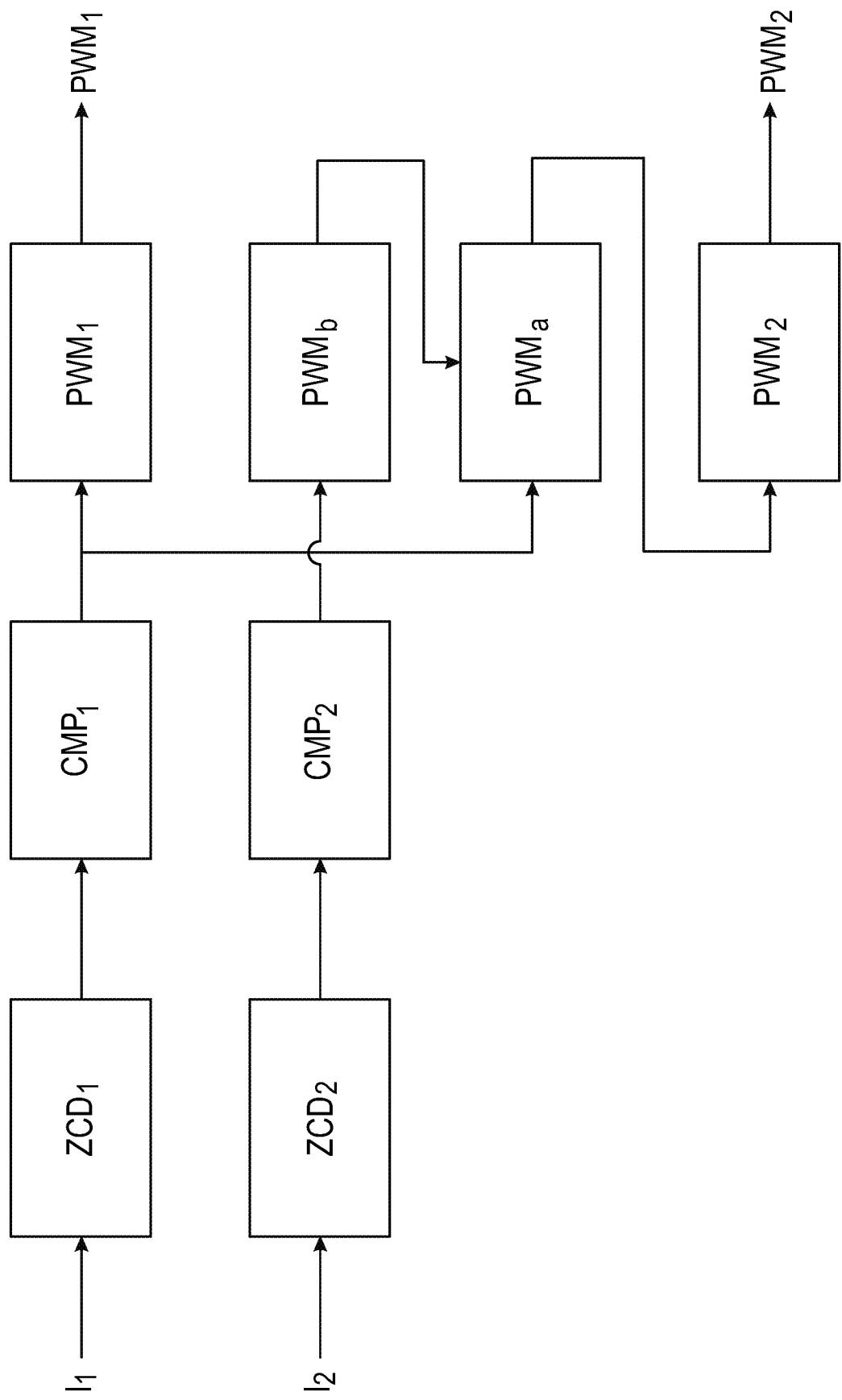
FIG. 7 shows a block diagram of an embodiment of a digital signal processor, configured for PWM synchronization mode.
Figure 8:
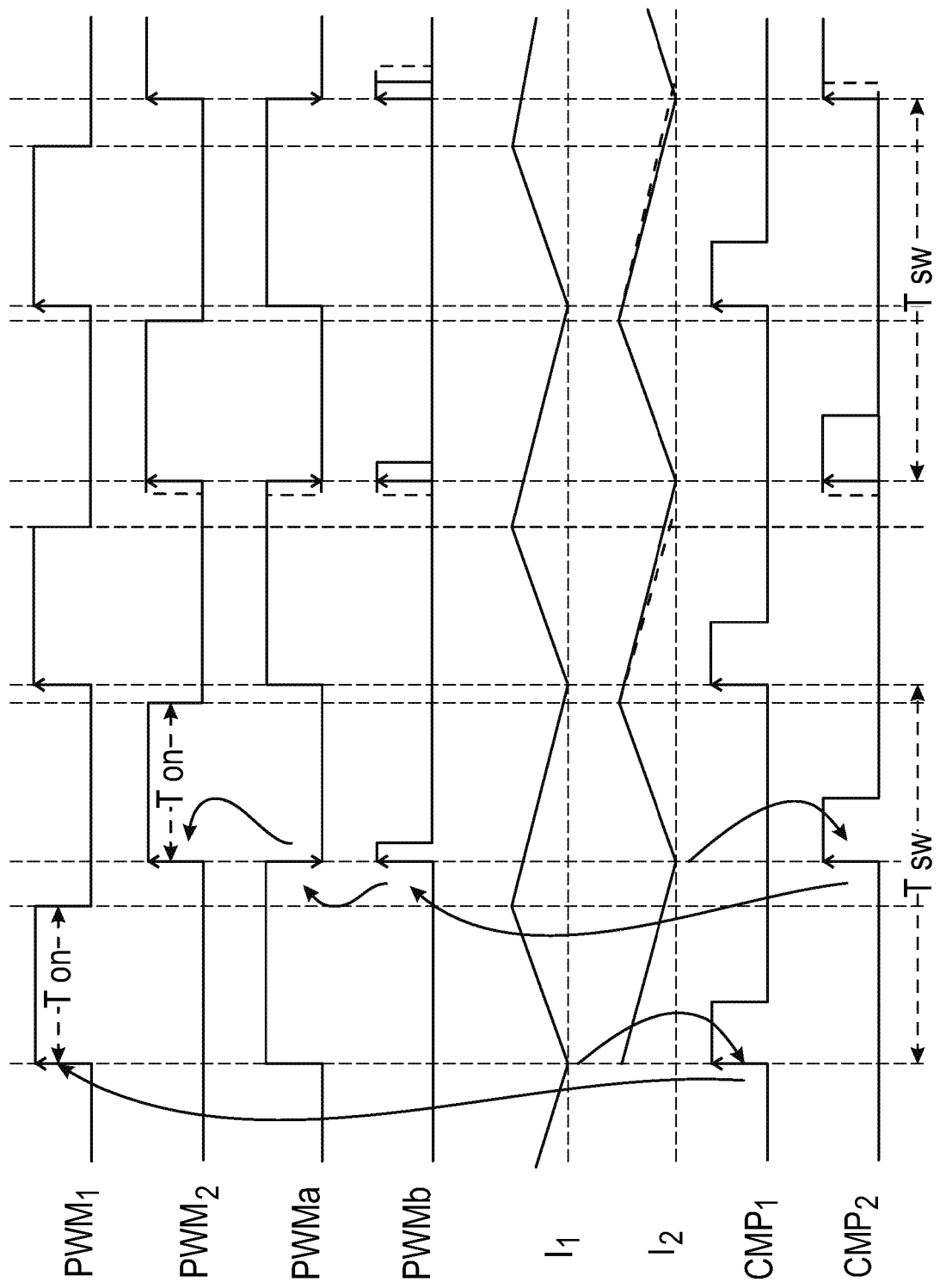
FIG. 8 shows a timing diagram of the embodiment of FIG. 7.

As will be apparent from FIG. 7, the current embodiment uses two "intermediate" PWM modules, namely PWMa and PWMb to obtain PWM2 for controlling the secondary interleaved circuit and MOSFET $S_2$. It is noted that all PWM modules according to this embodiment are operated in current reset mode.

PWM1 is generated as discussed in the preceding with reference to FIG. 6, namely based on the zero-current point, determined by $ZCD_1$. Based on the detected zero-current point, comparator circuit $CMP_1$ generates a pulse to start or restart (reset) a PWM cycle for signal PWM1. Corresponding to the preceding operating mode, the desired on-time of the two MOSFETs $S_1$ and $S_2$ is determined from the current voltage $V_{OUT}$ at output 8 and comparator 53 and the reference voltage $V_{REF}$. The total PWM cycle time T is determined from the preceding PWM cycle, as discussed. It is noted that all comparator circuits $CMP_N$ are peripherals of the DSP.

With respect to the generation of PWM2, intermediate PWMb signal is generated from the determined zero-current point of the secondary interleaved circuit, as determined by the zero-current sensor $ZCD_2$, and a corresponding start or restart pulse, generated by comparator circuit $CMP_2$. The PWMb signal thus starts a new cycle upon the determined zero-current point and thus determines the instant of the zero-current point. The PWMb signal is provided to a further PWM module for generating PWMa. This PWM module also receives the $CMP_1$ signal, as well as the determined PWM cycle time T. PWMa is started or restarted using the $CMP_1$ pulse, corresponding to a zero-current point of the first interleaved circuit. PWMa is programmed with a duty cycle T/2, i.e., half of the PWM cycle time of the first interleaved circuit. PWMb is used to truncate PWMa at the zero-current point of the secondary interleaved circuit, as shown in the timing diagram of FIG. 8.

The PWMa signal is provided to a fourth PWM module of DSP 52 to provide PWM2 to the MOSFET $S_2$ of the secondary interleaved circuit, using a falling edge of PWMa to trigger a start or restart of a PWMb cycle. The on-time of PWMb is set to correspond to the on-time of PWMa.

In this embodiment, the comparators $CMP_1$ and $CMP_2$ also allow to add a control delay for the switching of MOSFETS $S_1$ and $S_2$. Such a delay may be useful in view that considering typical parasitic capacitances, in particular of MOSFETS $S_1$ and $S_2$, the actual zero moment of the inductors may not ideal for the switching in view the voltage across the parasitic capacitance of the of MOSFETS $S_1$ and $S_2$ in this case would discharge through the of MOSFETS $S_1$ and $S_2$. To counter this loss, a delay may be introduced. The delay time is predefined, based on the parasitic capacitance value. Typical delay times range between 100 nanoseconds and 400 nanoseconds. It is noted that in view of the rather small delay introduced in the switching of MOSFETS $S_1$ and $S_2$, the delayed switching points are still considered as zero-current points herein.

Figure 9:
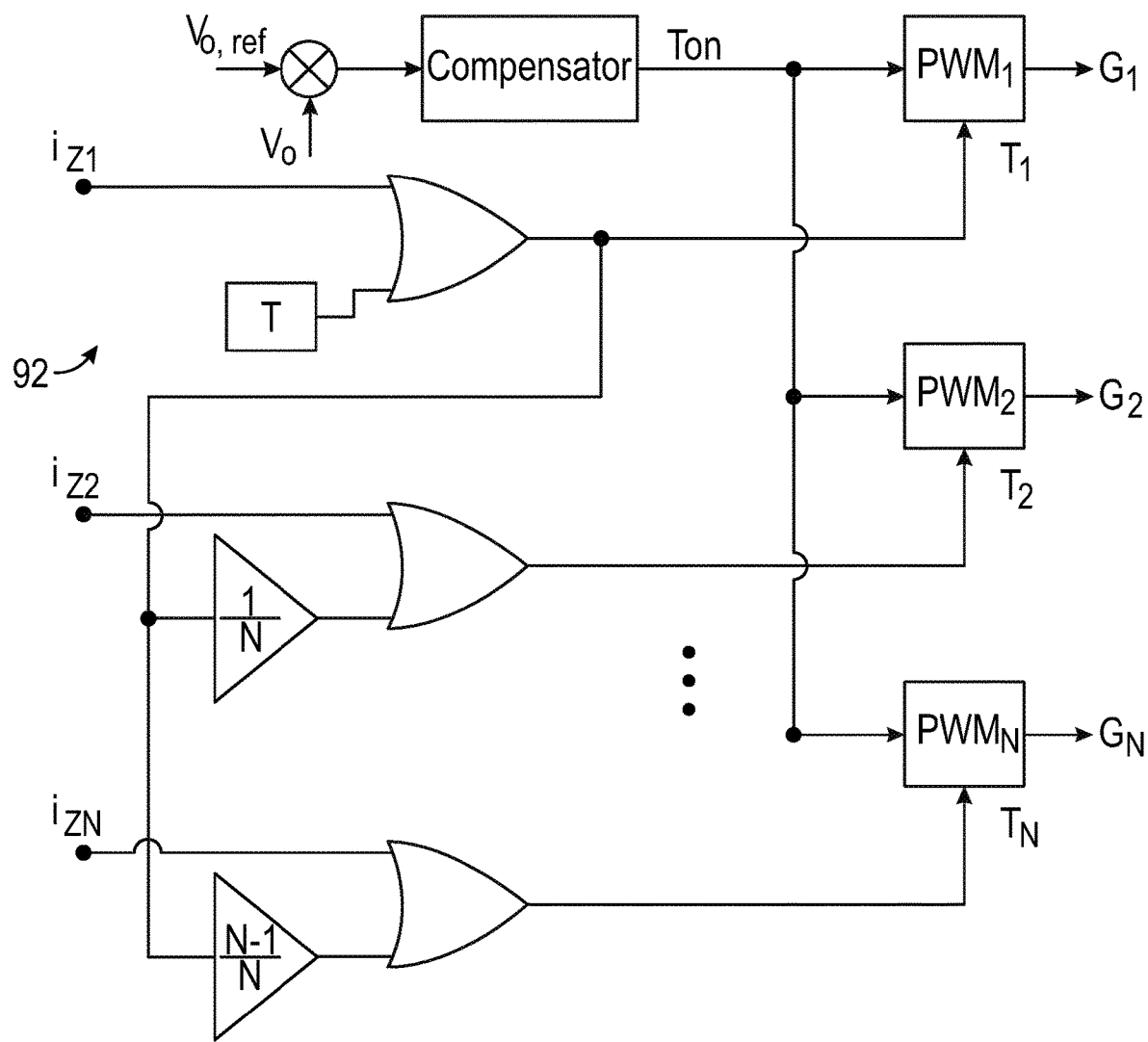
FIG. 9 shows a schematic block diagram of a further embodiment of a digital signal processor.

FIG. 9 shows a schematic block diagram of a digital signal processor 92, operating according to the preceding operating modes for a total of N interleaved circuit $ILC_N$. Certainly, the digital signal processor 72 in this case comprises a corresponding number of PWM drive modules.

Figure 10:
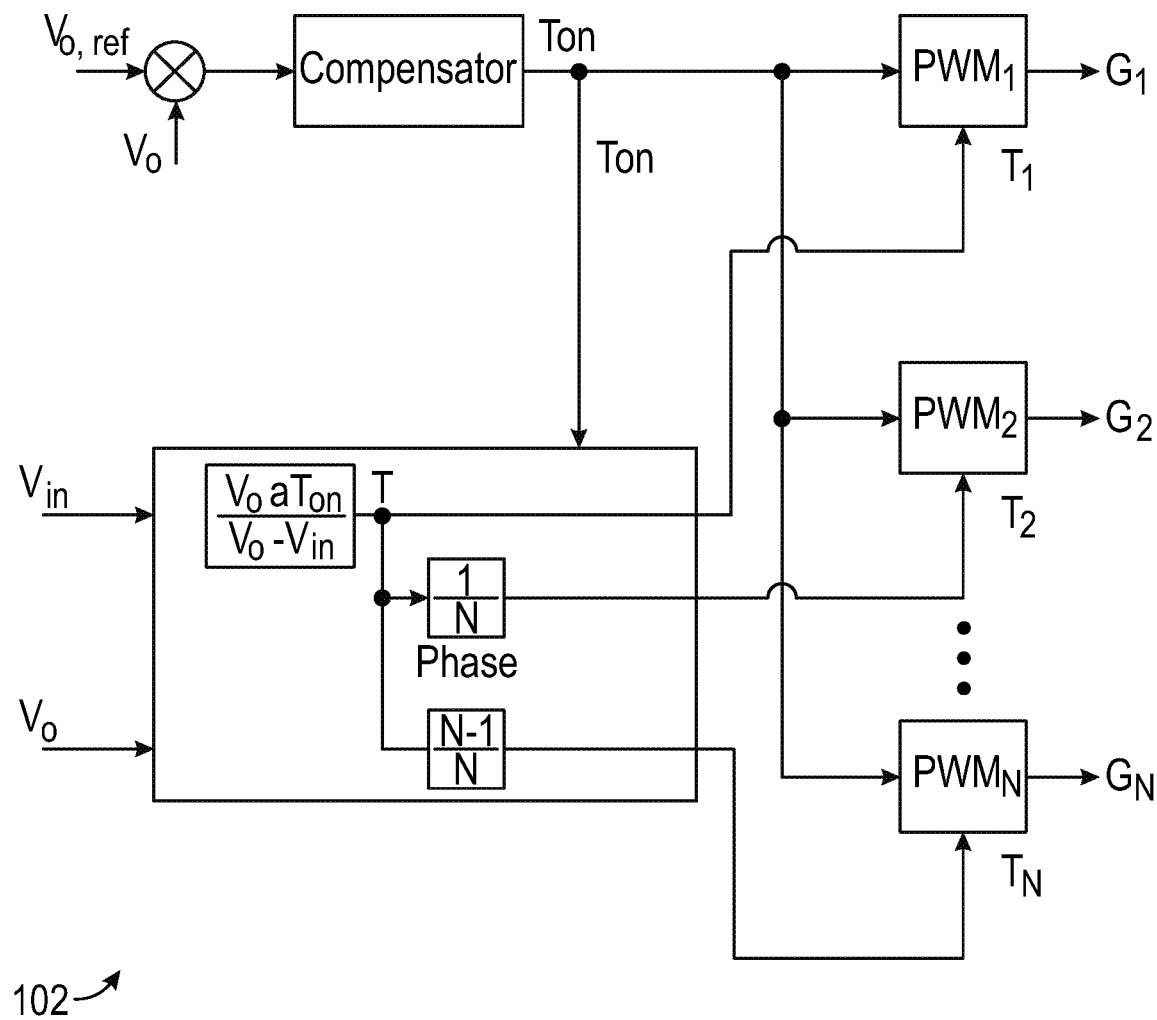
FIG. 10 shows a schematic block diagram of yet another embodiment of a digital signal processor.

FIG. 10 shows a further embodiment of a digital signal processor 102 in a schematic block diagram. As can be seem from the FIG., the present embodiment uses the voltages $V_{IN}$, $V_{OUT}$, and $V_{REF}$ to control the PWM operation, without a current measurement being necessary. Accordingly, current sensors $ZCD_N$ can be omitted herein, thus reducing the cost and size of the overall setup.

Using the two voltage signals, corresponding to $V_{IN}$ and $V_{OUT}$, as well as a predefined voltage reference $V_{O,REF}$, provided again by an internal memory (not shown) of digital signal processor 102, the digital signal processor 102 calculates the zero-current points in each PWM cycle, i.e., the points in time, where the inductor currents $i_{LN}$ respectively reaches zero.

The signal processor 102 in the present embodiment is a digital signal processor of dsPIC33EP series type.

Figure 11:
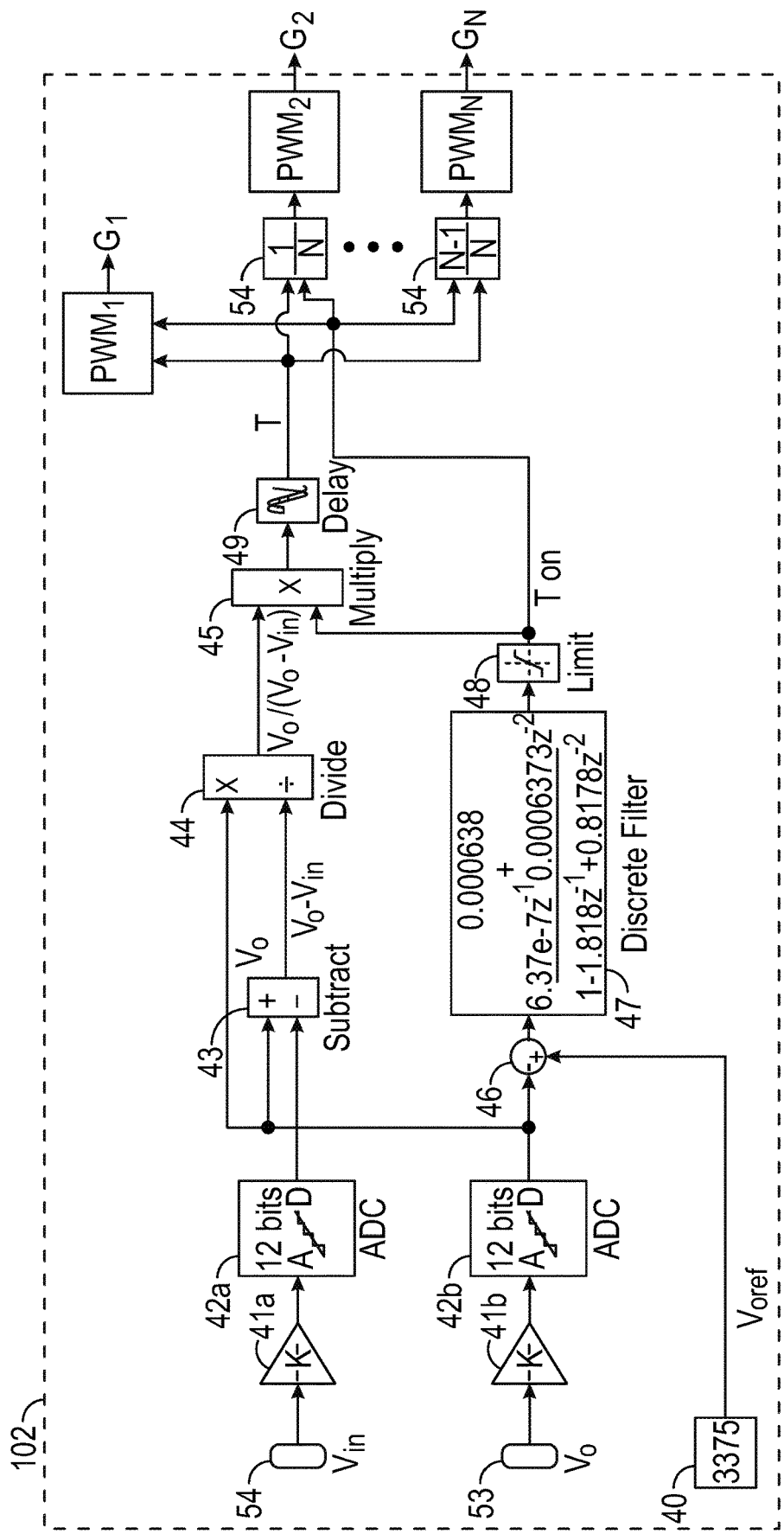
FIG. 11 shows a more detailed schematic block diagram of the embodiment of FIG. 10.

FIG. 11 shows a more detailed schematic block diagram of the embodiment of FIG. 10.

The first (corresponding to $V_{IN}$) and second (corr. to $V_{OUT}$) voltage signals are received at and subsequently sampled by the respective comparators 54 and 53 (see FIG. 5). The predefined voltage reference $V_{O,REF}$ is obtained from memory 40.

Signal processor 102 is configured to sample the voltage signals at T/2 when the duty cycle of the PWM is lower than 50%, i.e., when $V_{IN} > V_{OUT}/2$ to $V_{IN,PEAK}$. This provides that the period corresponds to the average of the input voltage. The bulk of the power transfer occurs during this interval. Since the duty cycle and the frequency are low in this case, there is adequate time for calculating the next zero-current point and the switching period.

For the remainder of the input voltage half-wave, the sampling frequency goes higher towards the zero-current point and there is no adequate time for computation if sampling would be done at T/2. Instead, for a duty cycle of equal to or higher than 50%, the signal processor 9 is configured to sample the voltage signals near the start of the cycle, for example after a small delay of 100 ns for switching transients to die down. Since the input voltage is small compared to its peak, the difference between the values sampled at start and T/2 is not significant The two voltage signals are provided to operational amplifiers 41a, 41b for signal conditioning and then provided to analog-to-digital (ADC) circuits 42a, 42b. The two ADC circuits 42a, 42b convert the voltage signals to digital information and are of 12 bit type with a Vmin: 0V and a Vmax: 3.3V.

Signal processor 102 further comprises multiple modules to provide the total PWM cycle time T and the on-time $T_{ON}$ to the PWM modules $PWM_N$. As shown in the upper part of FIG. 11, subtraction module 43 and division module 44 provide $$\frac{V_{OUT}}{(V_{OUT} - V_{IN})}$$

to multiplication module 45. The upper path, shown in FIG. 11, is a high frequency execution path to compute the PWM period value, operating at a maximum frequency in this embodiment of 500 kHz.

In the lower part of FIG. 11, the on-time for the PWM, $T_{ON}$, is calculated from $V_{OUT}$, i.e., the current output voltage and the predefined voltage reference $V_{O,REF}$. Summing node 46 compares the current output voltage $V_{OUT}$ with the "set point" $V_{O,REF}$. The resulting error signal is provided to filter/compensator 47, which runs at a relatively low frequency, e.g., 10 Hz, to remove second harmonic components, typically present in the output voltage $V_{OUT}$.

The filtered error signal is provided to limiter 48. The limiter 48 provides safety, in particular in a load side short circuit situation. During a short circuit on the output/load side, the ON time of MOSFETs $S_N$ tend to go higher. Limiter 48 limits the maximum on time $T_{ON}$, and thus the maximum power, fed to the output. Accordingly, a short circuit situation is safely handled. If both, the input voltage and the on-time are within limits, an over power condition does not arise.

Multiplier 45 receives the correspondingly processed error signal as on-time $T_{ON}$ and correspondingly provides $$\frac{V_{OUT}}{(V_{OUT} - V_{IN})} \times T_{ON}$$

to delay 49 and subsequently to PWM modules $PWM_1$ as total PWM period time T. The phase of the remaining PWM modules is calculated based on the PWM period time T through a respective phase shift module 54.

$T_{ON}$ is also directly provided to the PWM modules $PWM_N$. Using T and $T_{ON}$, each PWM module can apply the appropriate PWM timing settings to the respective gates $G_N$ of MOSFETs $S_N$. In view that the calculation is based upon $V_{OUT}$ and $V_{IN}$, the zero-current point in each PWM cycle reliably determined.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment in which:
- instead of or in addition to inductor 4, a capacitor is used as an energy storage device;
- an EMI (electromagnetic interference) filter is included and designed to pass lower frequency components and attenuate the higher frequency components;
- filter/compensator 47 is a 2P2Z or a PID controller; and/or
- instead of current sensor $ZCD_N$ comprising a coupled inductor, current sensor $ZCD_N$ comprises a CT or Hall Effect sensor, or a sensing resistor for inductor current measurement and/or diode current measurement.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module, or other unit may fulfill the functions of several items recited in the claims.

The mere fact that certain measures are recited in mutually different dependent claims does not indicate that a combination of these measured cannot be used to advantage. Any reference signs in the claims should not be construed as limiting the scope.

Appendix

Embodiments of the present disclosure include microcontrollers, systems, integrated circuit devices, and methods for digital control of interleaved boundary mode. Such PFC may be implemented by any suitable combination of analog circuitry, digital circuitry, instructions for execution by a processor, or combination thereof. Embodiments of the present disclosure may further be implemented in power supplies or controllers for power supplies.

FIG. 1 is an illustration of an example circuit for implementing control of interleaved boundary mode power factor correction (PFC).

Boundary mode PFC may include a variable frequency topology wherein the switching frequency is varying over an alternating current (AC) line cycle. The variable frequency may be due to zero-inductor-current PWM switching. The frequency may be primarily dependent on the input voltage, output load, and inductor value. Whenever two or more stages of boost converters in the PFC circuit are interleaved, the input current ripple current may be lowest when the phase difference between the two switching waveforms is 180 degrees. If the phase is not controlled, it could lead to a ripple current higher than that of a single stage, as the individual ripple currents may add up. Accordingly, embodiments of the present disclosure may achieve zero current switching and phase difference in a switching cycle with variations in the input, output, and power component values.

The input current ripple may depend on the relation between the switching waveforms. Embodiments of the present disclosure may be configured to find a single instant in every switching cycle where the inductor current is zero and the phase is also 180 degrees with respect to the other switching waveform. In order to achieve this, the frequency of both the stages may be same in every switching cycle within the AC line cycle. The switching frequency may be dependent on the value of the inductor, provided two (or more) stages are identical in design. The inductor value could vary and is dependent on the tolerance. However if a constant ON time is provided to both the stages, their period may be fixed independent of the inductor value, ignoring the small change in the input voltage due to phase difference. However the current sharing may be inversely proportional to the value of their inductance value. Thus, embodiments of the present disclosure compare output voltage with a reference to generate an error. This error is passed through a digital filter to get the ON time Ton, which may depend on the input voltage and output load value. The filter may provide an appropriate value of on time to satisfy the output voltage within tolerance and input current closely following input voltage for high power factor. To achieve both the zero current and phase requirements, the start of the new PWM cycle may be triggered by a signal generated from both the zero current and the phase signal. The zero current signal may be generated by the current sensing circuit or calculations, while the phase signal can be generated by calculations or by measurement from the previous cycle. One of the several stages becomes a master and meets only the zero current requirement. There might be no criteria for selecting the master stage. The remaining stages may generate the trigger signal based on the master period and their own zero current signals. Thus a minimum input ripple current can be achieved with the use of interleaved converters.

In FIG. 1, in an interleaved multistage boundary mode PFC, the EMI filter may attenuate high frequency components near the zero crossing of the input voltage waveform. This may result in a prolonged zero current situation near the zero crossing, thereby leading to a distorted current waveform. With high power factor, the input current wave shape may be the same as that of the input voltage. Near zero cross, the input voltage and input current levels may be very low. The input current levels may increase with the input voltage and are highest near the peak of the input voltage.

The PFC may include two or more identical sections of boost converters. The boost converters may include an inductor, switch, and diode. The boost converters may convert AC input voltage to DC output voltage. The boundary mode operation may have advantages of higher efficiency and power factor. One of the drawbacks of this topology is the variation in switching frequency over the line cycle. Towards zero crossing of the AC line cycle, the frequency is highest, while the frequency is lowest at the peak.

In one embodiment, a new PWM switching cycle may be synchronized with zero inductor current. The zero inductor current instant can be sensed using, for example, a current sensor or coupled inductor, or determined by calculations. Whenever there are more than one stage, the input current ripple may be a function of the phase difference between the switching waveforms of different stages. The input currents may cancel out each other and provide a low ripple, when the phase difference between them is 360/N. This has an impact on the size of the input EMI filter. A smaller filter may be adequate to provide required attenuation for passing the THD requirements.

As seen in FIG. 1, the input to the circuit is the AC supply of, for example, 110V at 60 Hz or 230V at 50 Hz. The input voltage may be rectified using a bridge rectifier. Furthermore the input voltage may be subsequently fed to one of the boost circuits. Given, for example, N boost stages or converters, each boost stage may be designed to handle a power of P/N, with adequate margins. The input and output capacitors may be common to all the boost stages, and can be lumped or distributed.

FIG. 3 illustrates basic input and output waveforms, according to embodiments of the present disclosure.

The dsPIC may be configured to sample the input and output voltage at the same instant using two ADCs, and control the gate waveforms of the switches. The zero switching instant for each stage can be determined by using a coupled inductor or inductor current sensing, or by appropriate calculations. A comparator within the dsPIC receives the sensing signal.

FIG. 9 illustrates an interleaved algorithm running inside the dsPIC, according to embodiments of the present disclosure. The dsPIC may compute the ON time using a digital filter and the difference between reference output voltage and the actual output voltage. The bandwidth of the output voltage may be kept low to prevent input current distortion. This may lead to a constant ON time over AC line cycle for a given input voltage and output load. The gating pulse to the switch (implemented as, for example, a MOSFET) is HIGH during the ON time and LOW during the OFF time. The pulsed width modulation (PWM) cycle may be restarted when the inductor current through the goes to zero. The master stage (PWM 1) restarts the PWM cycle whenever the inductor current goes to zero. The only other constraint may be the maximum time period, which is activated whenever zero current signal does not arrive within a given time. For the remaining stages, in addition to the zero current, the phase difference with respect to the master stage may be required to be 360/N. This may be achieved by using the T1 time of the master and multiplying it with appropriate phase delay to obtain individual time periods. The first slave needs a T1*360/N phase delay, while the Nth one would need a T1*(N−1)/N phase delay. The computation of the delay may be done by dsPIC to obtain the phase signal. The actual OR-ing of the zero current and phase signals may be performed by logic gates inside dsPIC or using the fault signals and additional PWM signals to truncate the given slave PWM.

FIG. 10 illustrates a second algorithm, where in the phase shifted time period signal is calculated by dsPIC, according to embodiments of the present disclosure. The dsPIC may compute the time period for the master based on the on time and the input, output voltages. In this method there might be no external zero current signals.

FIG. 4 illustrates individual gate signals for N=4, according to embodiments of the present disclosure. The inductor current ripple and the input current ripple are also shown. There is a marked reduction in the input current ripple with proper phase difference between the gate signals. This coupled with zero current switching enables a PFC with a smaller EMI filter and high efficiency, high power factor, operation

What is claimed is:

1. A circuit arrangement for interleaved switched boundary mode power conversion, comprising at least: an input for receiving an input voltage from a power supply; an output to provide an output voltage to a load; a first interleaved circuit comprising: a first energy storage device; and a first controllable switching device; one or more secondary interleaved circuits, each comprising: a secondary energy storage device; and a secondary controllable switching device; said circuit arrangement further comprising a signal processor, connected to the first controllable switching device and the secondary controllable switching device; the signal processor comprising a first switching cycle controller, configured for cycled zero-current switching operation of the first controllable switching device; and one or more secondary switching cycle controllers, configured for cycled zero-current switching operation of the secondary controllable switching device, wherein the signal processor is configured to control, in a given switching cycle, an on-time period of the secondary controllable switching device to correspond to an on-time period of the first controllable switching device; and wherein the signal processor is further configured to control the phase of the on- time period of at least one secondary controllable switching device with respect to the first controllable switching device to correspond to (n−1)/N*360, where N is a total number of interleaved circuits and n is an index number of a respective secondary interleaved circuit of the secondary controllable switching device.

2. The circuit arrangement of claim 1, wherein the signal processor during zero-current switching is configured to control the first and secondary switching devices at least at one zero-current point of an associated energy storage device.

3. The circuit arrangement of claim 2, wherein the signal processor is configured to control the first and secondary switching devices from an off-state to an on-state at the at least one zero-current point.

4. The circuit arrangement of claim 1, wherein the signal processor is configured to control the on-time periods to correspond to each other in every switching cycle.

5. The circuit arrangement of claim 1, wherein the signal processor is configured to control the phases between the on-time periods of the first and the secondary switching device in every switching cycle.

6. The circuit arrangement of claim 1, wherein each of the first and one or more secondary switching cycle controllers is configured for PWM operation of an associated controllable switching device.

7. The circuit arrangement of claim 1, wherein the signal processor comprises a delay module, configured so that at least one switching point is delayed for a predetermined delay time.

8. The circuit arrangement of claim 1, wherein each of the first and the one or more secondary interleaved circuits comprises an energy storage current sensor, connected with the signal processor to determine at least one zero-current point of an associated energy storage device.

9. The circuit arrangement of claim 1, wherein the signal processor is configured to determine the on-time period of the first controllable switching device from one or more of the input voltage, the output voltage, and a reference output voltage.

10. The circuit arrangement of claim 1, wherein the signal processor is configured to determine a switching cycle period of the first interleaved circuit from a previous switching cycle of the first interleaved circuit.

11. The circuit arrangement of claim 1, wherein
the first switching cycle controller is configured for PWM operation, wherein the first controllable switching device is set to an on-state at a zero-current point of the first energy storage device; and wherein
the one or more secondary switching cycle controllers are configured for PWM operation with a phase of $$\frac{(n-1)}{N} * 360,$$

where N is the total number of interleaved circuits and n is an index number of the respective secondary switching cycle controller.

12. The circuit arrangement of claim 1, wherein
the first switching cycle controller is configured for PWM operation, wherein the first controllable switching device is set to an on-state at a zero-current point of the first energy storage device; wherein two subsequent zero-current points define a switching cycle period of the first interleaved circuit; and wherein
the signal processor comprises a PWM module, configured to trigger an intermediate PWM cycle upon an on-state transition of the first controllable switching device and to conduct a phase state transition at half of the switching cycle period of the first interleaved circuit; and wherein
one of the secondary switching cycle controllers is configured for PWM operation, wherein an associated controllable switching device is set to an on-state upon the phase state transition of the intermediate PWM cycle.

13. The circuit arrangement of claim 1, wherein the signal processor is further configured to receive input voltage and output voltage information and to determine at least one zero-current point from the input voltage and output voltage information.

14. The circuit arrangement of claim 1, wherein the signal processor further comprises a limiter, configured to provide maximum on-time information to a PWM module.

15. The circuit arrangement of claim 1, wherein the circuit arrangement is a boost converter.

16. The circuit arrangement of claim 1, further comprising a rectifier circuit to rectify an AC input voltage.

17. A signal processor for use in a circuit arrangement for interleaved switched boundary mode power conversion with at least a first controllable switching device and one or more secondary controllable switching devices; said signal processor being connectable to the first and one or more secondary controllable switching devices and being configured for zero-current switching of the switching devices; wherein the signal processor comprises at least; a first switching cycle controller, configured for cycled zero-current switching operation of the first controllable switching device; and one or more secondary switching cycle controllers, configured for cycled zero-current switching operation of the secondary controllable switching devices, wherein the signal processor is configured to control, in a given switching cycle, an on-time period of each of the secondary controllable switching devices to correspond to an on-time period of the first controllable switching device; and wherein the signal processor is further configured to control the phase of the on-time period of at least one secondary controllable switching device with respect to the first controllable switching device to correspond to (n−1)/N*360, where N is a total number of interleaved circuits and n is an index number of a respective secondary interleaved circuit of the secondary controllable switching device.

18. A method of interleaved switched boundary mode power conversion with a circuit comprising an input for receiving an input voltage from a power supply; an output to provide an output voltage to a load; a first controllable switching device; and one or more secondary controllable switching devices; wherein in a given switching cycle, an on-time period of each of the secondary controllable switching devices is controlled to correspond to an on-time period of the first controllable switching device; and wherein a phase of the on-time period of at least one secondary controllable switching device with respect to the first controllable switching device is controlled to correspond to (n−1)/N*360, where N is a total number of interleaved circuits and n is an index number of a respective secondary interleaved circuit of the secondary controllable switching device.

19. A non-transitory machine-readable medium including contents that are configured to cause a signal processor to conduct the method of claim 18.

* * * * *